Sept. 14, 1948.  R. J. LINDSEY  2,449,400
FOLLOW-UP TYPE SERVOMOTOR
Filed Oct. 7, 1942  2 Sheets-Sheet 1
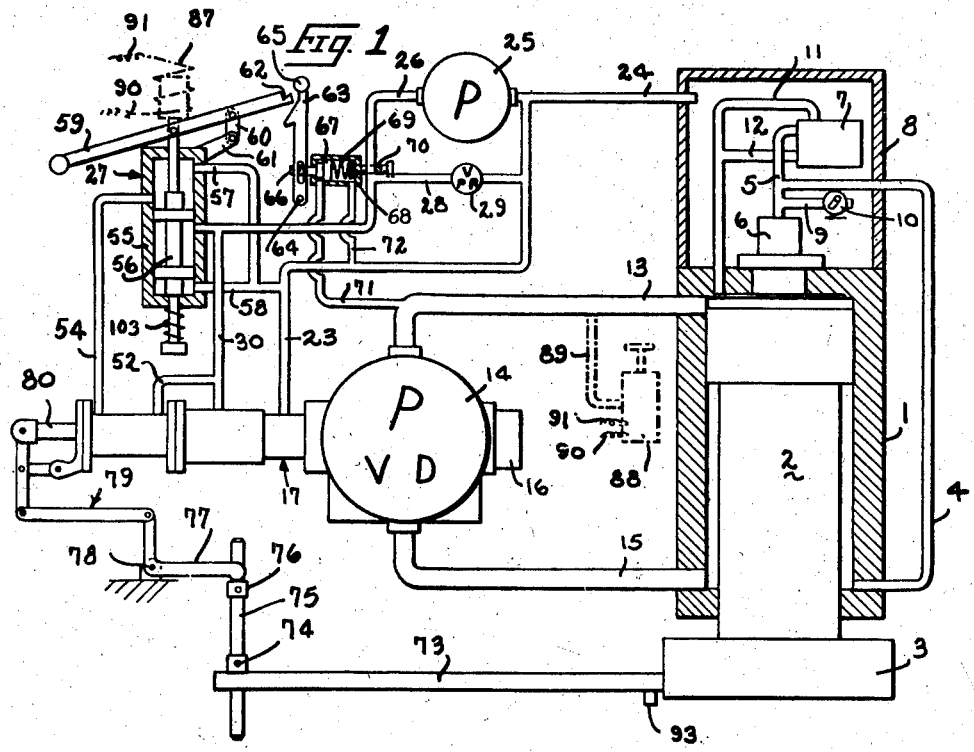
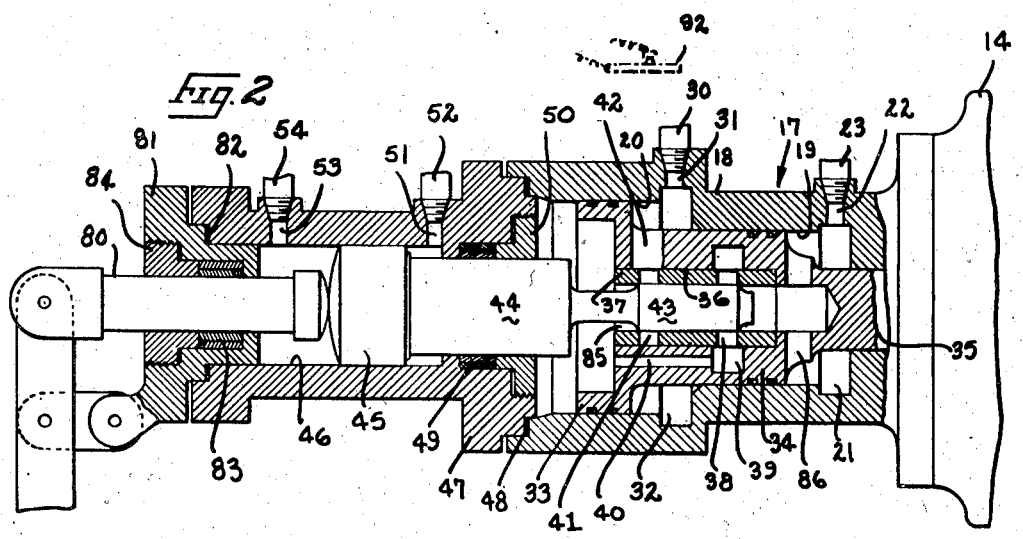
INVENTOR
ROBERT J. LINDSEY
BY
ATTORNEYS

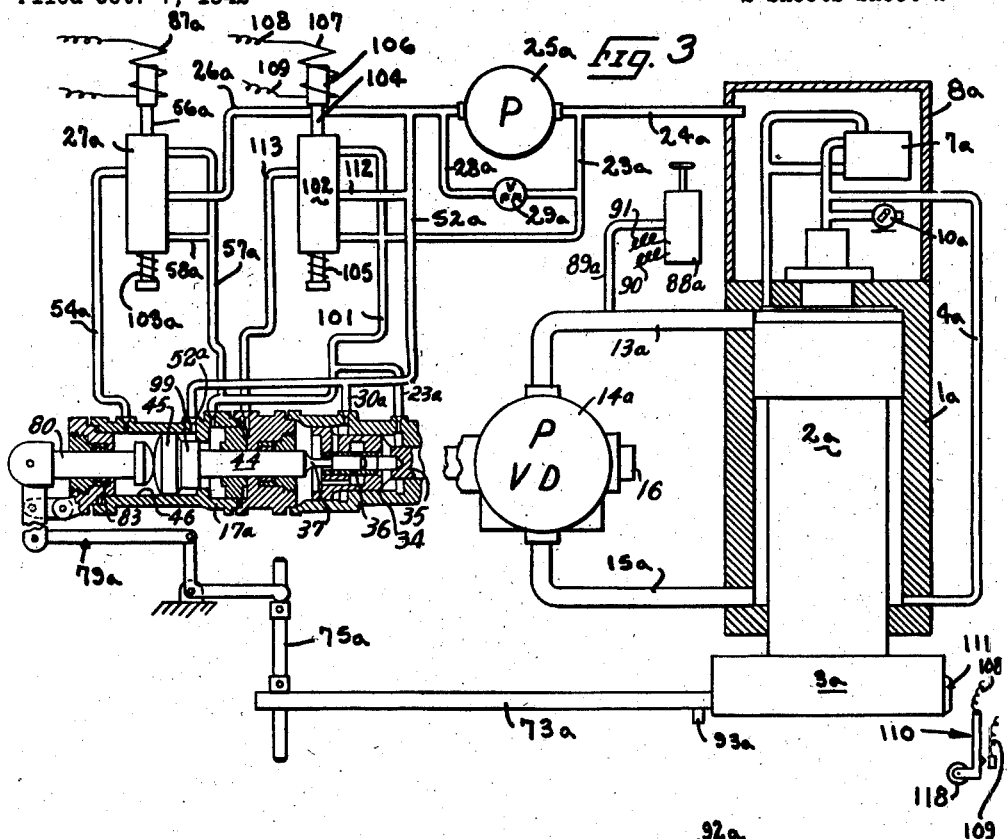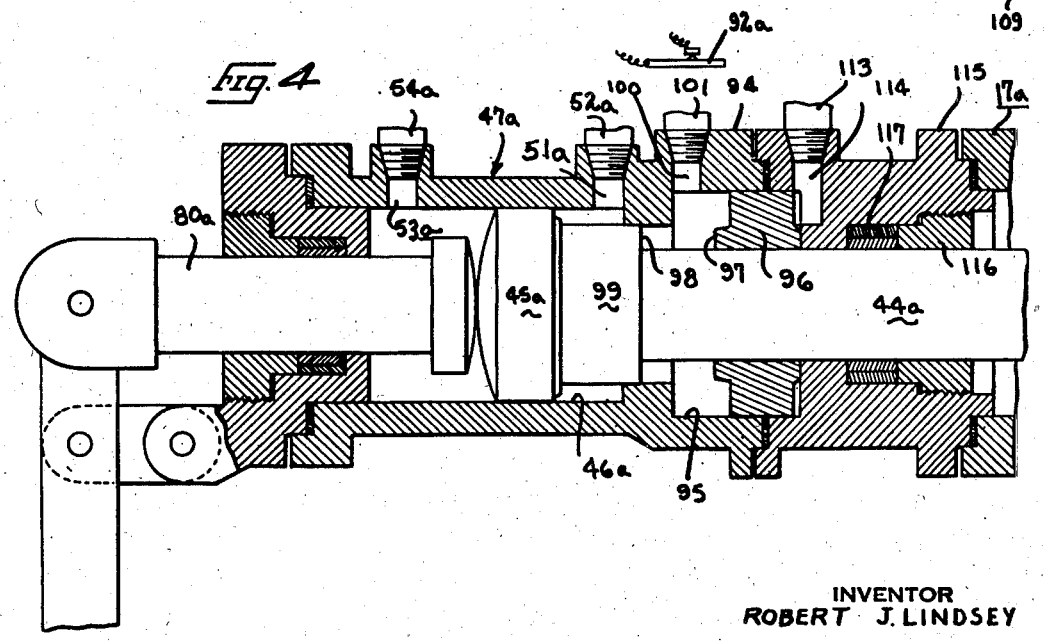

Patented Sept. 14, 1948

2,449,400

UNITED STATES PATENT OFFICE 2,449,400

FOLLOW-UP TYPE SERVOMOTOR

Robert J. Lindsey, Mount Gilead, Ohio, assignor to The Hydraulic Development Corp., Inc., Wilmington, Del., a corporation of Delaware Application October 7, 1942, Serial No. 461,209

2 Claims. (Cl. 121—41)

This invention relates to hydraulic machinery and, especially, to control mechanism for use in connection with a reciprocable member. Although not limited to the control of servomotors for hydraulic pumps, the invention has particular advantages when used for such purposes.

In this connection it may be mentioned that heretofore, for controlling the movement of the control element in servomotors associated with variable delivery pumps, it has been customary to connect the control element through a linkage with the armature of a solenoid. Such an arrangement requires a rather heavy solenoid which is not only high in price but also increases the cost of production, due to the great amount of electric power required for the operation of such a solenoid. Furthermore, while such solenoid is adapted to shift the control element in one direction only, a spring is usually provided for shifting the control element in the opposite direction when the solenoid is deenergized.

It is, therefore, an object of this invention to provide a control mechanism for controlling a reciprocable element, in which no heavy solenoid is required for shifting the said reciprocable element, and in which the said element may be moved in opposite directions by one and the same member.

It is another object to provide a control mechanism for controlling a reciprocable member which comprises an element movable by pressure fluid and movably connected with said reciprocable member, while another element is adapted hydraulically to be reciprocated for controlling the flow of actuating fluid to said first mentioned element.

A still further object of the invention consists in the provision of a control mechanism as set forth in the preceding paragraph, which includes additional hydraulically operable means for moving the hydraulically reciprocable element into a position between its center position and one of its end positions.

It is still another object to provide a control mechanism for a hydraulically reciprocable member, which includes a valve element movable to control the supply of actuating fluid to said hydraulically reciprocable member, and also includes fluid operable means for controlling said valve element, while fluid connections are provided to allow one and the same fluid source to deliver actuating fluid to said hydraulically reciprocable member and also to said fluid operable means.

It is also an object to provide a hydraulic press system including a fluid source of variable delivery, controlled by servomotor means, and an auxiliary fluid source for delivering actuating fluid to said servomotor means, in which all reciprocable elements in said servomotor means are hydraulically actuated by fluid from said auxiliary fluid source, and in which control means is provided operable manually for controlling the supply of fluid from said auxiliary fluid source to said servomotor means.

Still another object of the invention consists in the provision of a hydraulic press system including a fluid source of variable delivery, controlled by servomotor means, and an auxiliary fluid source for delivering actuating fluid to said servomotor means, in which all reciprocable elements in said servomotor means are hydraulically actuated by fluid from said auxiliary fluid source, and in which electrically operable valve means is provided for controlling the supply of fluid from said auxiliary fluid source to said servomotor means.

These and other objects and advantages of the invention will appear more clearly from the following specification in connection with the accompanying drawings, in which:

Figure 1 is a diagrammatic illustration of a press system including a control mechanism according to the present invention.

Figure 2 is a section through the control mechanism used in connection with Figure 1.

Figure 3 is a diagrammatic illustration of a further press system including a second embodiment of the control mechanism according to the present invention.

Figure 4 is a partial section through the control mechanism used in connection with the press system of Figure 3.

Referring now to the drawings and to Figures 1 and 2 thereof in particular, the press system shown in Figure 1 comprises a press cylinder 1 having reciprocably mounted therein a press ram 2 carrying a press platen 3.

The lower portion of the press cylinder 1 is connected with a conduit 4 leading to a conduit 5, one end of which leads to a surge valve 6, while the other end is connected to a main cylinder relief and pump by-pass valve 7. The valve 6 and 7 do not form a part of the present invention and may be of any standard design, for instance of the type disclosed in the Ernst Patents No. 2,193,-248 and No. 2,268,205 respectively.

The surge valve 6 is adapted in response to a suction effect in the upper portion of the press cylinder 1 to open and to allow fluid from the fluid reservoir or tank 8 to flow through the surge valve into the cylinder 1 to prefill the same, while the ram moves downwardly by gravity.

The main cylinder relief and pump by-pass valve 7 is provided to relieve pressure in the upper portion of the press cylinder 1 at the initiation of the retraction stroke of the press ram 2, to thereby facilitate the initiation of the retraction stroke of the press ram.

Connected to the conduit 5 is a conduit 9 including a check valve 10. The main cylinder relief and pump by-pass valve 7 is connected through conduits 11 and 12 with the upper portion of the press cylinder 1. Also connected with the upper portion of the cylinder 1 is a conduit 13 leading to one side of a variable delivery pump 14, the other side of which communicates through a conduit 15 with the lower part of the press cylinder 1.

Associated with the variable delivery pump 14, which may for instance be a radial piston pump of conventional design, is a casing 16 housing centering springs, not shown in the drawing, which continuously tend to move the flow control member of the pump 14 into and hold the same in its neutral or no delivery position. The centering spring arrangement may be of the construction shown in the U. S. Patent No. 2,184,665 to Ernst.

Also connected with the pump 14 is a servomotor, generally designated 17, which comprises a cylinder 18 with a bore 19 and a larger bore 20. Provided at the right hand end of the bore 19 is an annular channel 21 which communicates through a passageway 22 with a conduit 23. The conduit 23 leads to a conduit 24, one end of which communicates with the fluid tank 8, while the other end is connected to the suction side of a constant delivery pilot pump 25. The pressure side of the pump 25 is connected to a conduit 26, which latter leads to a control valve, generally designated 27, and is adapted to communicate with the conduit 23 through a conduit 28 and a pressure relief valve 29.

Branching off from the conduit 26 is a conduit 30 which communicates through a passageway 31 with an annular groove 32 in the servomotor bore 20. Reciprocably mounted in the bore 20 is a piston 33 which is integral with a piston 34 reciprocably mounted in the servomotor bore 19. The piston 34 has connected thereto a shaft which in its turn is connected to the flow control member of the pump 14. The pistons 33 and 34 are provided with a bore 36 in which is pressfitted a sleeve 37. The sleeve 37 is provided with a radial bore 38 communicating with an annular channel or groove 39 which in its turn communicates through a longitudinal channel 40 with the left side of the piston 33. The sleeve 37 is furthermore provided with a radial bore 41 adapted to communicate through a passageway 42, the bore 20 and the annular groove 32 with the conduit 30.

Reciprocably mounted in the sleeve 37 is a valve rod 43 which is connected by means of a piston rod 44 with the double-acting piston 45. The piston 45 is reciprocably mounted in a bore 46 of a cylinder 47 connected, in any convenient manner, with the cylinder 18. To prevent leakage, a gasket 48 is interposed between the cylinders 18 and 47 and, furthermore, packing material 49 is provided around the piston rod 44 and compressed by a gland 50.

The right hand end of the bore 46 is connected through a passageway 51 with a conduit 52 which latter is in fluid communication with the conduit 30. The left hand end of the cylinder 47 communicates through a passageway 53 with a conduit 54 which latter leads to the valve 27. The valve 27 comprises a casing 55 having reciprocably mounted therein a valve member 56 which is continuously urged into its lower position by a spring 103. The valve member 56, when in its lower position, establishes fluid connection between the conduit 54 and the conduit 57 communicating with a conduit 58, while conduit 54 is adapted to communicate with the conduit 26 when the valve member 56 occupies its uppermost position.

The upper end of the valve member 56 is pivotally connected with a manually operable lever which in its turn is pivotally connected with a link 60. The link 60 is pivotally connected to an arm 61 connected to the cylinder 55 of the valve 27. The lever 59 is provided with a stepped portion 62 adapted to be latched to a latch member 63, which is adapted to swing about a pivot 64. One end of the latch member 63 is provided with a handle 65 for manual operation of the latch member, while the other end of the latch member is pivotally connected with a rod 66 having a piston portion 67 reciprocably mounted in a cylinder 68.

Interposed between the right hand end of the cylinder 68 and the piston portion 67 is a spring 69, which continuously urges the piston portion 67 into its left hand position. The thrust of the spring 69 is adjustable by a screw 70. The left hand end of the cylinder 68 is connected by a conduit 71 with the conduit 13, while the right hand end of the cylinder 68 is connected through a conduit 72 with the conduit 23.

The press platen 3 is provided with an arm 73 which in its turn is adapted to engage a collar 74 adjustably mounted on a control rod 75. Also adjustably mounted on the rod 75 is a rod 76 adapted to cooperate with a bellcrank lever 77 adapted to swing about the pivot 78 and pivotally connected through a link system 79 with a push rod 80. The push rod 80 extends into the bore 46 of the cylinder 47 through a closure member 81, connected with the latter in any convenient manner. To prevent leakage, a gasket 82 is interposed between the cylinder 47 and the closure member 81, and packing material 83 compressed by a gland 84 is interposed between the closure member 81 and the push rod 80.

Operation of first embodiment

It may be assumed that all parts of the press system occupy the position shown in Figures 1 and 2, and that it is now desired to perform a working cycle of the ram 2. To this end, the operator starts the driving motors, not shown, for the pumps 14 and 25 and swings the lever 59 in clockwise direction so as to cause the portion 62 to be latched by the latch member 63. In this way, the valve member 56 has been moved into its uppermost position, in which fluid connection is established between the conduit 26 and the conduit 54. As a result thereof, pressure fluid from the pilot pump 25 flows through conduit 26 and conduit 54 into the cylinder bore 46 where it acts on the left side of the piston 45. Simultaneously, fluid pressure is conveyed through conduits 26 and 30 to the right side of the piston 33 and through the conduit 52 to the right side of the piston 45. The fluid pressure acting on the right side of the piston 33 has no effect at this time, since the fluid between the left side of the piston 33 and the adjacent portion of the cylinder 47, gland 50 and piston rod 44 cannot escape. The fluid pressure acting on the left and larger area of the piston 45 overcomes the fluid pressure acting on the smaller and right hand area of the piston 45, thereby moving the piston 45 and, consequently, also the valve rod 43 toward the right until the piston 45 abuts the right hand end of the bore 46. As a result thereof, the radial bore 41 is released by the piston rod 43 so that pressure fluid now flows from the right hand side of the piston 33 through the passageway 42, the radial bore 41 and the bore 85 toward the left side of the piston 33.

Since the area on the left side of the piston 33 is larger than the effective right hand area of this piston, the piston 33 and, therefore, also the shaft 35 moves toward the right. This places the flow control member of the pump 14 into position for forward stroke delivery.

Pressure fluid from the pump 14 is now delivered through conduit 13 into the upper portion of the cylinder 1, while fluid is withdrawn from the lower portion of the cylinder 1 through conduit 15. Therefore, the press ram 2 moves downwardly by gravity as fast as fluid is withdrawn from the lower portion of the cylinder 1. Due to the suction effect created in the upper portion of the cylinder 1, the surge valve 6 opens and the fluid delivered by the pump 14 through the conduit 13 into the upper portion of the cylinder 1 is supplemented by fluid flowing from the tank 8 through the surge valve 6.

While the platen 3 is thus moving downwardly, the control rod 75 follows this downward movement, due to the fact that the lever 77 is, at this time, urged in clockwise direction by the action of the pressure fluid on the push rod 80. When the platen 3, or a die connected thereto, engages the work piece to be shaped by the press, pressure builds up in the upper portion of the cylinder 1 and causes the surge valve 6 to close. The ram 2 is then advanced by pressure fluid from the pump 14.

When, at the end of the shaping operation, a predetermined pressure has built up in the upper portion of the press cylinder 1, this pressure is conveyed through the conduit 71 into the left hand portion of the cylinder 68 where it acts upon the piston 67 so as to move the latter against the thrust of the spring 69 toward the right. This results in an anticlockwise movement of the latch member 63 so that the stepped portion 62 is released by the latch member 63 and the spring 103 moves the valve member 56 into its lowermost position, shown in the drawing. While pressure still prevails in the conduits 30 and 52 the conduit 54 is now connected through conduit 57 and the conduit 23 with the conduit 24, which latter, as mentioned above, is connected on one hand to the suction side of the pump 25 and on the other hand to the tank 8. Therefore, no pressure now prevails in the left hand portion of the bore 46 so that the pressure fluid conveyed from the pump 25 through conduit 52 and passageway 51 to the right side of the piston 45 moves the latter toward the left. As a result thereof, the valve rod 43 closes the radial bore 41, if the latter should not have been closed previously by the follow-up movement of the piston 33, and releases the radial bore 38 so that fluid connection is now established between the left side of the piston 33 and the conduit 24 through the passageway 40, annular channel 39, the bore 85, the radial passageway 86, the passageway 22 and the conduit 23.

The pressure fluid conveyed from the pump 25 through the conduit 30 to the right side of the piston 33 moves the latter toward the left so that the shaft 35, rigidly connected to the flow control member of the pump 14, moves this flow control member into retraction stroke position. Pressure fluid delivered by the pump 14 now flows through the conduit 15 to the lower portion of the press cylinder 1 from where it is conveyed through conduit 4 to the main cylinder relief and pump by-pass 7 so as to cause the latter to release pressure from the upper portion of the press cylinder 1 through conduit 11 into the tank 8, so that the pressure in conduit 5 may open the surge valve 6.

The pressure conveyed to the lower portion of the press cylinder 1 then causes upward movement of the ram 2, while the fluid expelled from the upper portion of the cylinder 1 is, in part, withdrawn through the conduit 13 to the pump 14 and, in part, expelled through surge valve 6 into the tank 8.

When the platen 3 approaches its retracted position, the platen arm 73, through the control rod 75 and link system 79, moves the push rod 80 inwardly so that the latter shifts the piston 45 toward the right, in a manner similar to that described above. This results in the establishment of fluid connection between the conduit 30 and the left side of the piston 33 so that the latter also moves rightwardly until the radial bore 41 is again closed by the valve member 43. When this happens, the flow control member of the pump 14 has been moved through the shaft 35 connected to the piston 33 into its neutral or no delivery position, and the press ram 2 comes to a halt. All parts now again occupy the position shown in Figures 1 and 2, and the press is ready for a new cycle.

As will be seen from the above, the control mechanism according to the present invention, has completely eliminated any electric means for shifting the valve rod 43, and this shifting movement in either direction is effected purely hydraulically.

It will also be appreciated that the spring 103, which heretofore was customarily provided between the right hand end of the bore 85 and the right hand end of the valve member 43, has been discarded.

To initiate a retraction stroke of the ram 2 before a predetermined pressure, corresponding to the setting of the spring 69, is established in the upper portion of the press cylinder 1, it is merely necessary to manually shift the latch member 63 in clockwise direction to thereby release the lever 59 and allow the downward movement of the valve member 56 by means of the spring 103. No great force is required to shift the valve member 56, since both ends of the bore in which the valve member 56 is reciprocated, are continuously connected with the conduit 24. If, however, for the sake of convenience, it is desired to effect the shifting movement of the valve member 56 in upward direction electrically, it is merely necessary to connect the upper portion of the valve member 56 with the armature of a small solenoid 87, as indicated in dot-dash lines in Figure 1. The solenoid 87 may then be energized in any convenient manner at the initiation of a working cycle of the press.

To effect deenergization of the solenoid 87, the conduit 13 may be connected to a tonnage control valve, indicated in dot-dash lines and designated 88, through conduit 89, likewise indicated in dot-dash lines. The tonnage control valve may be of any conventional design, for instance, of the type disclosed in U. S. Patent No. 2,224,957 to Ernst, and is electrically connected through lines 90 and 91 with the solenoid 87.

If, instead of pressure reversal, it should be desired to reverse the ram 2 in response to a predetermined position, the solenoid 87 may be connected with a normally closed switch 92, indicated in dot-dash lines, which is opened by the platen arm portion 93 when the ram 2 reaches the desired position for reversing the same.

Referring now to Figures 3 and 4, the structure shown therein corresponds substantially to the structure shown in Figures 1 and 2, and the elements of Figures 3 and 4, corresponding to those of Figures 1 and 2, have been designated with the same reference numerals, however, with the additional letter a.

The difference between the structure of Figures 1 and 2 on one hand and the structure of Figures 3 and 4 on the other hand, consists in that the last mentioned structure has a mechanism adapted to temporarily slow down the downward movement of the press ram when the latter approaches the position at which it normally encounters resistance exerted by the work piece to be shaped.

More specifically, the cylinder 47a is provided with an extension 94 having a bore 95 in which is reciprocably mounted a piston 96. The piston 96 has a hub portion 97 adapted to engage an annular area 98 formed by the piston rod 44a and the portion 99 interconnecting the piston rod 44a and the piston 45a. The left hand side of the bore 95 is connected through a passageway 100 and a conduit 101 with a valve, generally designated 102, which in its structure corresponds to the valve 27 of Figure 1.

The condut 101 communicates through conduit 57a with the upper portion of the valve 27a. The valve 27a is furthermore connected through conduit 58a with the conduit 57a. Also communicating with the valve 27a is the conduit 26a leading to the pressure side of the pilot pump 25a, the suction side 24a of which leads to the tank 8a. Connected with the conduit 24a is the conduit 23a leading to the lower portion of the valve 102.

The valve member 104 of the valve 102 is continuously urged downwardly by a spring 105 in the same manner as the spring 103 of Figure 1 urges the valve member 56 downwardly. The upper portion of the valve member 104 is connected to an armature 106, controlled by a solenoid 107 which is connected through lines 108 and 109 with a switch, generally designated 110, and adapted to be closed by a cam 111 carried by the press platen 3a. When the switch 110 is closed, the solenoid 107 is energized so as to close the valve member 104, causing the latter to move to its uppermost position. The valve 102 is furthermore connected through a conduit 112 with the conduit 52a, one end of which leads to the conduit 26a, while the other end is connected to the passageway 51a.

A fourth conduit 113 is adapted to effect fluid connection between the valve 102 and a passageway 114 provided in a cylindrical portion 115 interposed between the extension 94 and the cylinder 17a. The passageway 114 communicates with the right hand end of the bore 95. The cylindrical portion 115 surrounds a portion of the piston rod 44a and is threadedly engaged by a gland 116 compressing packing material 117 surrounding the piston rod 44a.

*Operation of second embodiment*

It may be assumed that all parts of the press system occupy the position shown in Figures 3 and 4, and that the valve members 56a and 104 are in their lowermost position. To start a working cycle of the press ram 2a, the operator starts the driving motors, not shown, for the pumps 14a and 25a. Furthermore, the operator energizes the solenoid 87a, to thereby shift the valve member 56a into its uppermost position. As a result thereof, pressure fluid delivered by the pump 25a passes through the conduit 26a and conduit 52a into the right hand end of the bore 46a.

Simultaneously, pressure fluid is conveyed from the pump 25a through the conduit 26a and conduit 54a into the left hand end of the bore 46a where it acts upon the left hand area of the piston 45a. Since this area is larger than the effective area acted upon by the pressure fluid at the right hand end of the bore 46a, the piston 45a and thereby the piston rod 44a move toward the right in the same manner as described above in connection with Figure 1. As set forth in detail in the description of the operation of the first embodiment, this results in placing the pump 14a into forward stroke delivery position. Consequently, pressure fluid from the pump 14a is now conveyed through the conduit 13a into the upper portion of the press cylinder 1a, while fluid is withdrawn from the lower portion of the press cylinder 1a through the conduit 15a. The ram 2a, therefore, moves downwardly by gravity as fast as fluid is withdrawn from the lower portion of the press cylinder 1.

When the ram 2a approaches the position at which normally the work piece is engaged by the platen 3a, or a die connected thereto, the cam 111 will engage the roller 118 of the switch 110, closing the latter and holding the same closed as long as the platen 3a, during its downward movement, causes engagement of the cam 111 with the roller 118. Closure of the switch 110 causes energization of the solenoid 107 so that the valve member 104 is moved into its uppermost position.

As a result thereof, fluid connection is established between the conduits 112 and 113 so that pressure fluid supplied by the pump 25a is delivered through conduits 26a, 52a, 112 and 113 and the passageway 114 to the right side of the auxiliary or slow-down piston 96. Since the left side area of the piston 96 is connected through the passageway 100, conduit 101 and the conduits 23a and 24a with the tank 8a, no pressure prevails on the left side of the piston 96a. Therefore, the pressure acting on the right side of the piston 96 causes the latter to move leftwardly.

Since the total of the effective area on the right side of the piston 96 and the right side area of the piston 45a is larger than the effective area on the left side of the piston 45a, the piston 45a is moved toward the left until the piston 96 engages the left side of the bore 95. The piston 45a then comes to a stop. When this happens, the flow control member of the pump 14a occupies a position corresponding to a restricted delivery position of the pump 14a. In other words, the pump 14a now delivers a reduced quantity of fluid to the upper part of the press cylinder 1a, while a correspondingly reduced quantity of fluid is withdrawn from the lower part of the cylinder 1a. Therefore, the downward movement of the ram 2a proceeds at reduced speed.

When the platen 3a has moved downwardly to such an extent that the cam 111 disengages the roller 118, the switch 110 again opens. This interrupts the energizing circuit for the solenoid 107 so that the spring 105 again moves the valve member 104 to its lowermost position and reestablishes the condition which prevailed before the cam 111 closed the switch 110. Therefore, the pressure fluid conveyed from the pump 25a to the left side of the bore 46a again moves the piston 45a toward its extreme right hand position, thereby again placing the pump 14a on full stroke delivery position. The press ram 2a now completes its working stroke in a manner similar to that described in connection with Figure 1.

The fluid expelled by the piston 96 while it is moved toward the right by the rightward movement of the piston 45a escapes, in part, through the conduit 113 into the conduit 24a and, in part, is conveyed through the conduit 101 to the left hand side of the bore 95.

When, at the end of the pressing stroke, a predetermined pressure has built up in the upper portion of the press cylinder 1a, this pressure is conveyed to the tonnage control valve 88a so as to cause the latter to break the energizing circuit for the solenoid 87a. As a result thereof, the spring 103a shifts the valve 56a into its lowermost position so that, in a manner similar to that described in connection with Figure 1, the right hand side of the bore 46a is connected with the conduit 24a, while the pressure acting on the right side of the piston 45a moves the latter toward the left. The pump 14a is then reversed so that pressure fluid delivered by the pump 14a through conduit 15a causes upward movement of the ram 2a. When, during this upward movement, the cam 111 closes the switch 110, thereby causing the valve member 104 to shift upwardly, this will have no effect on the retraction stroke of the ram 2a. All that happens merely consists in a leftward movement of the piston 96 without, however, causing any engagement between the hub portion 97 and the portion 98, since the piston 45a is in its left hand position. As soon as the cam 111 leaves the roller 118, the hydraulic condition prevailing at the first portion of the retraction stroke of the ram is restored.

When the press platen 3a approaches the end of its retraction stroke, the platen arm 73a, through the rod 75a, link system 79a and push rod 80a, moves the piston 45a, and, thereby, the pump 14a into the neutral or no delivery position. The press ram 2a then comes to a halt and all parts again occupy the position shown in Figure 3. The press is then ready for a new cycle.

If, instead of initiating the retraction stroke by a predetermined pressure in the upper portion of the press cylinder 1a, it is desired to bring about the retraction stroke in response to a predetermined position reached by the platen 3a, the switch 92a may be provided and so adjusted that, at the desired point of reversal, it will be opened by the cam 93a in the same manner as previously described in connection with Figure 1.

It is, of course, understood that, if desired, the solenoid 87a and tonnage control valve 88a may be replaced by a manually operable mechanism, similar to the mechanism shown in Figure 1 and comprising the elements 59, 63 and 68.

It will be understood that I desire to comprehend within my invention such modifications as come within the scope of the claims.

Having thus fully described my invention, what I claim as new and desire to secure by Letters Patent is:

1. In a servomotor, a first differential piston, a first cylinder within which said first piston is reciprocable, said cylinder including fluid inlet means and fluid outlet means, a valve associated with said first piston for controlling the flow of fluid to and from said first cylinder, a second differential piston integral with said valve, a second cylinder within which said second piston is reciprocable, said second cylinder being coaxial with said first cylinder and attached thereto, a rod member for abutting and actuating said second piston in one direction irrespective of fluid pressures acting thereon, an auxiliary piston slidable on said second piston for engaging and moving the same a predetermined distance in the other direction and having a greater effective area than said second piston, and valve means selectively operable for supplying actuating fluid to said pistons for moving said first piston into full stroke position at both ends of its travel and into short stroke position in one direction, and means for actuating said rod member from outside said cylinders to move said first piston into a neutral position in the said one direction.

2. A hydraulic servomotor comprising a first fluid operable double acting piston, a valve means associated with said first piston for controlling the flow of pressure fluid thereto, a second fluid operable double acting piston attached to said valve means and movable hydraulically into either of two end positions, a rod member abutting said second piston and adapted to move said second piston from one of said end positions to a point midway between said end positions irrespective of fluid pressure acting on said piston, a third fluid operable piston adapted to move said second piston from the other of said end positions to a point substantially less than midway between said end positions and having a greater effective area than said second piston, valve means selectively operable for supplying actuating fluid to said pistons for actuating said rod member for actuating said first piston into either of its end positions or into a short stroke position in one direction, and means for actuating said rod for moving said first piston into a neutral position from the said one end position.

ROBERT J. LINDSEY.

REFERENCES CITED

The following references are of record in the file of this patent:

UNITED STATES PATENTS

| Number | Name | Date |
|---|---|---|
| 715,961 | Bouvier | Dec. 16, 1902 |
| 1,732,813 | Kasley | Oct. 22, 1929 |
| 1,821,502 | Ellis | Sept. 1, 1931 |
| 1,834,922 | Abercrombie | Dec. 8, 1931 |
| 1,923,923 | Ellis | Aug. 22, 1933 |
| 1,952,663 | Ernst | Mar. 27, 1934 |
| 2,038,272 | Ernst | Apr. 21, 1936 |
| 2,139,965 | Ljungstrom | Dec. 13, 1938 |
| 2,142,500 | Douglas | Jan. 3, 1939 |
| 2,184,665 | Ernst | Dec. 26, 1939 |
| 2,230,054 | Ernst | Jan. 28, 1941 |
| 2,230,055 | Ernst | Jan. 28, 1941 |
| 2,234,009 | Robinson | Mar. 4, 1941 |
| 2,238,061 | Kendrick | Apr. 15, 1941 |
| 2,238,062 | Kendrick | Apr. 15, 1941 |
| 2,238,063 | Kendrick | Apr. 15, 1941 |
| 2,239,882 | Davis | Apr. 29, 1941 |
| 2,263,812 | MacMillin et al. | Nov. 25, 1941 |
| 2,267,149 | Ernst | Dec. 23, 1941 |
| 2,298,359 | Ernst | Oct. 13, 1942 |
| 2,304,831 | Kendrick | Dec. 15, 1942 |
| 2,375,204 | Baker | May 8, 1945 |

FOREIGN PATENTS

| Number | Country | Date |
|---|---|---|
| 55,421 | Switzerland | Mar. 16, 1911 |
| 84,804 | Switzerland | Apr. 16, 1920 |